US 6,467,819 B2

(12) United States Patent
Seifert et al.

(10) Patent No.: US 6,467,819 B2
(45) Date of Patent: *Oct. 22, 2002

(54) METHOD FOR ROTATIONAL ATTACHMENT OF A CONNECTION FITTING TO AN OPPOSING SURFACE

(75) Inventors: Rainer Seifert, Bad Krozingen (DE); Rolf Steiner, Gundelfingen (DE); Helmut Gerber, Waldkirch (DE); Jürgen Adolf, Denzlingen (DE)

(73) Assignee: Anton Hummel Verwaltungs GmbH, Waldkirch (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/506,008

(22) Filed: Feb. 17, 2000

(65) Prior Publication Data

US 2002/0053800 A1 May 9, 2002

(30) Foreign Application Priority Data

Feb. 18, 1999 (DE) .......................................... 199 06 870

(51) Int. Cl.⁷ ............................ F16L 19/12; B29C 45/16
(52) U.S. Cl. ...................... 285/341; 285/212; 285/347; 264/242
(58) Field of Search ................................ 285/347, 353, 285/349, 220, 212, 423, 341; 411/301, 302, 303; 425/542, 331; 264/264, 242, 249, 260; 277/316, 617

(56) References Cited

U.S. PATENT DOCUMENTS

| | | | | | |
|---|---|---|---|---|---|
| 3,074,748 A | * | 1/1963 | Ulrich | ......................... | 285/347 |
| 3,650,551 A | * | 3/1972 | Akers | ......................... | 285/220 |
| 3,695,642 A | * | 10/1972 | DeWoody | ...................... | 285/353 |
| 3,933,358 A | * | 1/1976 | Hoer | ............................ | 285/212 |
| 3,950,483 A | * | 4/1976 | Spier | .......................... | 264/328 |
| 4,003,669 A | * | 1/1977 | Fenske et al. | ............... | 285/355 |
| 4,066,269 A | * | 1/1978 | Linne | ........................... | 277/228 |
| 4,310,182 A | * | 1/1982 | Vandenbossche | ........... | 285/353 |
| 4,519,636 A | * | 5/1985 | Tomlin et al. | .............. | 285/349 |
| 4,531,767 A | * | 7/1985 | Andreolla | ..................... | 285/349 |
| 4,580,816 A | * | 4/1986 | Campbell et al. | ........... | 285/347 |
| 4,682,797 A | * | 7/1987 | Hildner | ....................... | 285/347 |

(List continued on next page.)

FOREIGN PATENT DOCUMENTS

| | | | | |
|---|---|---|---|---|
| AU | 160076 | * | 2/1953 | ................. 285/220 |
| DE | 2922851 | * | 12/1980 | ................. 285/220 |
| DE | 27 15 525 C 2 | | 4/1986 | |
| DE | G 93 15 601.4 | | 4/1994 | |
| DE | 43 43 005 C1 | | 4/1995 | |
| DE | 44 03 702 C 2 | | 3/1996 | |
| DE | 44 40 852 C1 | | 6/1996 | |
| DE | 195 08 509 A 1 | | 9/1996 | |
| DE | 297 15 018 U 1 | | 12/1997 | |
| EP | 0 131 956 A 1 | | 1/1985 | |
| EP | 0 341 880 A2 | | 11/1989 | |

*Primary Examiner*—Eric K. Nicholson
(74) *Attorney, Agent, or Firm*—Akin, Gump, Strauss, Hauer & Feld, L.L.P.

(57) ABSTRACT

A method is provided for rotationally attaching a connection fitting with an opposing surface by screwing the fitting into the opposing surface by threads on an outer surface of the fitting body. The connection fitting is formed by at least one seal manufactured together with the fitting body in an injection molding process to form a multi-component plastic part in which the fitting body is made of a hard plastic component and the seal is made of a soft plastic component, wherein the components are of a kind which do not adhere to one another. The seal is secured in an axial direction on the fitting body in a form-fit manner, but during the rotational attachment step the seal is rotatable relative to the fitting body in a peripheral direction.

10 Claims, 2 Drawing Sheets

U.S. PATENT DOCUMENTS

| | | | | |
|---|---|---|---|---|
| 4,838,491 A | * | 6/1989 | Bennett et al. | 285/355 |
| 4,934,742 A | * | 6/1990 | Williamson | 285/212 |
| 5,350,090 A | * | 9/1994 | McClure | 222/511 |
| 5,375,893 A | * | 12/1994 | Guest | 285/910 |
| 5,433,489 A | * | 7/1995 | Kimura et al. | 285/220 |
| 5,667,305 A | * | 9/1997 | Walker | 374/148 |
| 6,224,058 B1 | * | 5/2001 | Drebing et al. | 277/313 |
| 6,315,510 B1 | * | 11/2001 | Sturies et al. | 411/182 |

\* cited by examiner

METHOD FOR ROTATIONAL ATTACHMENT OF A CONNECTION FITTING TO AN OPPOSING SURFACE

BACKGROUND OF THE INVENTION

The invention relates a connection fitting with a fitting body or a connection body, which directly by itself or indirectly has a rotatable attachment device, such as threads or a bayonet (quarter-turn) fastener and at least one seal. The fitting may be, for example, a drain plug for radiators or other liquid containers, ventilation valve, pipe connector, lid, stop insert, support sheath and/or clamping ring for a pipe screw fitting or the like. The fitting or connection body and the seal are a multi-component plastic part, in which the fitting or connection body is made of the harder plastic component and the seal is made out the other softer plastic component.

Connection fittings of this type are known in various forms depending on the application. For example, there are known drain plugs for radiators or according to German patent DE 44 40 852 C1 for other liquid containers, or a ventilation valve according to German utility model DE 297 15 018, or a pipe connector according to German patent DE 27 15 525 C2, or a lid according to published German patent application DE 195 08 509 A1. In these cases or even other comparable arrangements, the actual fitting body is made of the hard plastic and the seal is made of the soft plastic. Consequently, the handling of such of connection fittings of the above type is simple for the user.

From German utility model G 93 15 601.4 and from German patent DE 44 03 702 C2, FIG. 16, connection fittings with fitting or connection bodies are known in the form of stop inserts for pipes to be connected. The inserts could be made of plastic and not have an attachment device themselves, such as a thread, but are instead attached indirectly via swivel nuts and counterparts, and also have seals made of softer materials on their stop and/or an accompanying support sheath.

It has proven to be useful that for different applications, the seal can be damaged by the opposing surface, if this opposing surface is rough or uneven, has impurities due to residual shavings, or even has a burr. If the connection fitting is rotated for its attachment, in order to bring its screw thread or its bayonet fastener into the corresponding mounting position, a relative rotation between the seal and the opposing surface can occur and rub the seal via an opposing surface, which under certain circumstances is uneven, fissured, or contaminated. In this way, the seal can be considerably damaged.

SUMMARY OF THE INVENTION

It is therefore an object of the invention to create a fitting with a seal in a multi-component plastic design, in which an advantage is manufacture in an injection molding tool or spray operation and/or the advantage is retained. The user practically only has to mount a single part. In spite of this, however, when screwing in this fitting, the seal cannot be destroyed or damaged by the opposing surface.

In order to achieve this apparently contradictory purpose, the connection fitting described at the outset is wherein the two different plastic components that form the fitting are plastics which are incompatible with each other, and the seal manufactured together with the fitting or connection body is arranged in the axial direction on the fitting or connection body in a form-fitting manner, but movable in the rotation direction, i.e. rotatable relative to the fitting or connection body.

The invention thus makes use of the discovery that in manufacturing a multi-component object made of incompatible plastics, they are in fact manufactured together in an advantageous way, and can thereby be connected to each other directly during manufacture, but in spite of this do not adhere to each other. In a suitable shape the seal can thus be manufactured with the fitting or connection body (hereinafter just "fitting body" for the sake of simplicity) in the injection molding process and can then be rotated relative to the fitting body, so that when screwing the fitting in and upon contact of the seal with an uneven and fissured opposing surface, the seal does not turn along with the fitting body when it is rotated further, and thereby avoids too great a damage to the seal. In this way, an axial form-fit in one direction, namely opposite the tightening or inward rotating direction, is sufficient.

It is expedient if the fitting body is made of polyacetal (polyoxymethylene or POM) and the seal is made of a thermoplastic elastomer or of rubber, such as EPDM, or of silicone. POM is a hard, durable plastic, which is suitable for the purpose of forming a fitting body with threads or a bayonet fastener even for rugged applications, and which has a very small water absorption capacity, thus allowing a long lifetime even during an application in heater construction on radiators or heater lines having extreme temperature fluctuations. Thermoplastic elastomers or rubber or silicone, in contrast, are reliable materials for seals, which however can be manufactured in one injection molding operation together with the fitting body, so that a subsequent mounting occurs in an advantageous way. Since these different plastics are, however, respectively incompatible with each other, it results that even during the manufacturing of the fitting, the two parts are not firmly affixed and melted to each other, as is the case for otherwise customary multi-component plastic parts, but instead the sealing ring can be rotated or held firmly in a ring groove in the fitting body that has been recessed especially for it, while the fitting can be rotated relative to the sealing ring. Thus, during the attachment of the connection fitting using threads or a bayonet fastener, an impairment or damage to the seal is then also avoided if the opposing seal surface has cut or scraped projections or similar uneven areas.

It is expedient if the ring-shaped seal has at least one recess or ring groove running around its sealing area and is flexible in the axial direction in the area of this recess or ring groove. By such a ring groove opening on the free circumference of the seal, it results that the seal can be compressed in the axial direction, not only because of its soft material, but also because of this shape. The seal can adapt correspondingly well to the unevenness of the opposing seal surface.

It is beneficial in the process if the radial depth of the recess or ring groove is approximately equal to or smaller than the radial overhang of the non-deformed seal in comparison to the outer diameter of the thread of the fitting body. In the thread area, the seal is then compact and suitably stable, while the overhang that functions above all for sealing against an opposing surface has the desired flexibility and adaptability.

In a connection fitting of the above type with a thread and a stop arranged in the tightening direction behind the thread, the seal can be arranged in the progression of the thread or between the thread and the stop. Especially the latter case is frequently applied for drain plugs, blind plugs, ventilation valves, pipe connections, pipe screw connections, etc.

When screwing a connection fitting of this type into an opposing part that has a corresponding opposing thread, this opposing part comes into contact with seal, so that the seal can then rotate relative to the connection fitting or instead relative to this opposing part, depending on where the smaller friction occurs. If the friction is too great between the seal and the opposing surface because of uneven areas, projections or sharp edges, the seal will stay in place relative to the further rotating connection fitting, thus not rotating along with it, so that damage and leaks resulting therefrom are largely excluded.

The seal can also be arranged, in a connection fitting of another type, between a stop and a bayonet fastener of the fitting body. A similar operating method thereby results as in an arrangement on a connection fitting with threads.

Especially with combination of individual or several of the features and measures described above, a connection fitting results in any desired adaptation to different uses, for example as a pipe connection, drain plug, ventilation valve, or the like, in which the fitting body and the seal constructed as a sealing ring are already connected to each other during manufacture. Thus, a subsequent mounting of the sealing ring onto the fitting is avoided, but nevertheless the sealing ring can be rotated relative to the fitting body, so that upon contact with an opposing surface that is damaging to the sealing ring under certain circumstances, such a relative movement between the sealing ring and the opposing surface can be avoided, in that this relative movement is transferred to the fitting body.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiment(s) which are presently preferred. It should be understood, however, that the invention is not limited to the precise arrangements and instrumentalities shown. In the drawings.

In the following described embodiment similar or corresponding parts are given the same reference numerals, even if they differ from each other in their form.

DETAILED DESCRIPTION OF THE INVENTION

Figure 1:
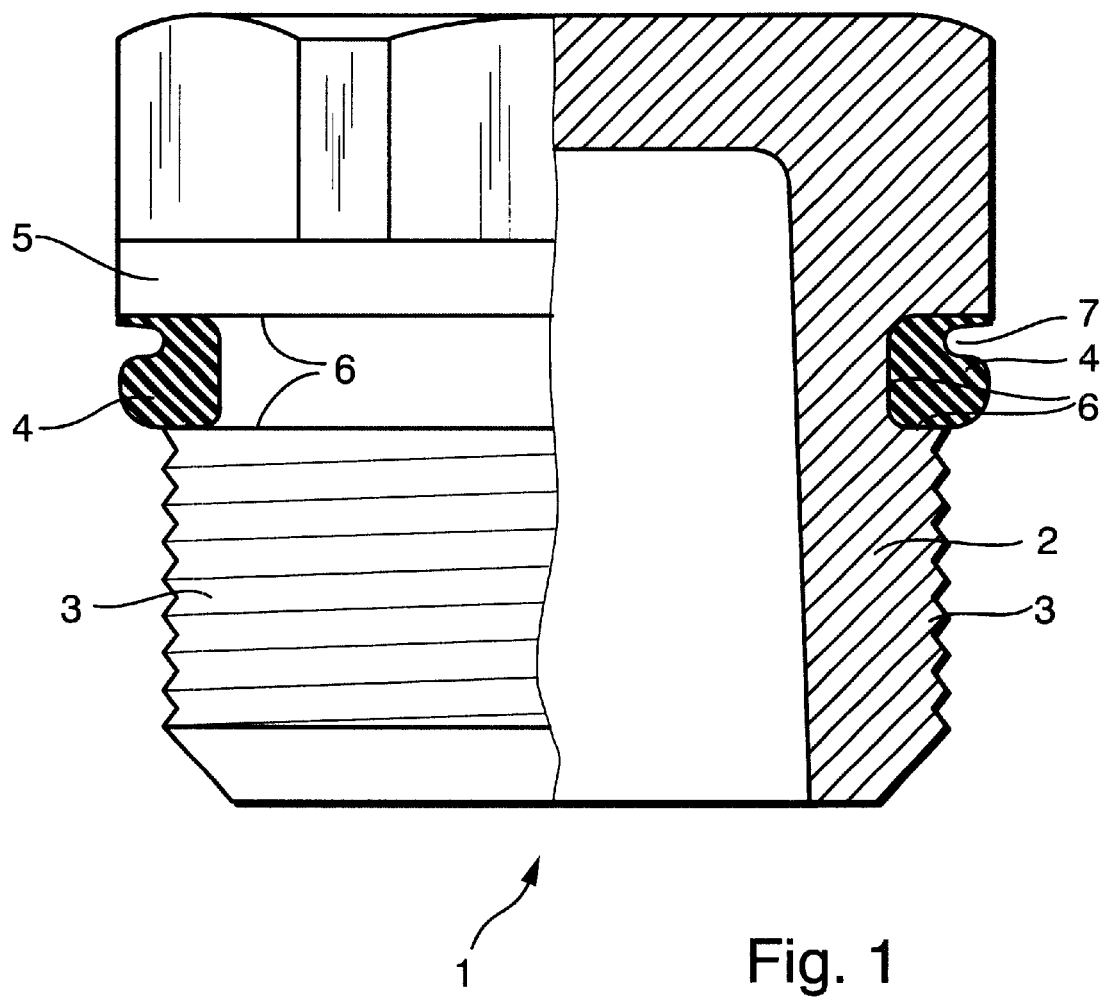
FIG. 1 is a side view, longitudinally sectioned in half, of a connection fitting in the form of a blind plug.

A connection fitting, indicated as a whole by 1, is constructed as a blind stop in the embodiment according to FIG. 1. However, it can also be constructed as a pipe connector, screw sheath of a pipe connection or a ventilation valve, etc. The connection fitting has a fitting body 2 with an outer thread 3 for the attachment to an opposing part and a ring-shaped seal 4, which is arranged in a groove 6 between the thread 3 and a stop 5.

This connection fitting 1 is a multi-component plastic part, i.e., the fitting body 2 is manufactured from a harder plastic component and the seal 4 is made of another softer plastic component.

It is provided therein that the two different plastic components are made of plastics that are incompatible with each other, so that the seal 4 manufactured together with the fitting body 2 is arranged in a form-fitting manner in the axial direction because of its arrangement in the groove 6, but is movable in the rotational direction, i.e. rotatable relative to the fitting body 2.

If this connection fitting 1 is screwed using the thread 3 into an opposing thread, and the seal 4 is thereby brought into contact with an opposing sealing surface which exerts a large friction on the seal 4, the seal stays where it is when the fitting body 2 is rotated further, because a relative rotation between the fitting body 2 and the seal 4 is possible. It is thereby avoided that the seal 4 becomes damaged or leaks by a relative movement against the aforementioned opposing surface.

One can recognize in FIG. 1 that the ring-shaped seal 4 has an outwardly opening ring groove 7 running around the outside of the sealing area, so that it is flexible in the axial direction in the area of this ring groove 7. In this way, not only because of the softness of its material but also because of this ring groove, this seal can adapt to an opposing surface that is possibly not completely round or planar, but instead has areas of unevenness or the like. This is possible since the seal 4 must not be rotated along with the fitting body 2 when it is pressed on such an opposing surface, in spite of the screw-tightening movement on the fitting body 2, the blind plug in the embodiment, although it was manufactured together with this body 2 in an injection molding process.

The radial depth of this ring groove 7 in the embodiment is thus approximately equal to the radial overhang of the non-deformed seal 4 relative to the outer diameter of the thread 3, an outer thread of the fitting body 2 in the embodiment. In the diameter area of the thread 3, in contrast, the seal is compact and stable and thus also retains its rotational ability relative to the fitting body 2, even under larger axial pressure loading. In a similar manner, the ring groove 7 can open radially inwardly in a seal 4 arranged inside a sheath, a nozzle, or a pipe.

In the embodiment according to FIG. 1, the seal 4 is arranged between the thread 3 and the stop 5. It is also possible, however, to provide such a seal in the progression of the threads, in case the connection fitting is to be mounted with the seal not against an end face or similar opposing surface, but instead in a sheath or a nozzle, or the like.

Figure 3:
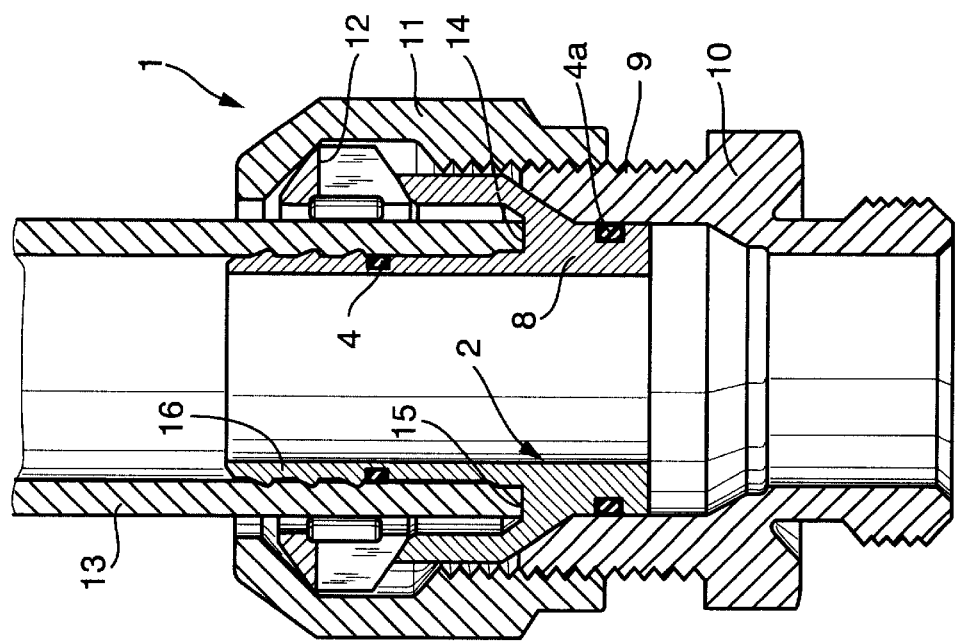
FIG. 3 is a representation corresponding to FIG. 2 of a pipe screw connection with a stop insert, which has a support sheath engages the pipe, wherein next to the seal running around the outside of the stop insert, an additional seal is provided on the support sheath.
Figure 2:
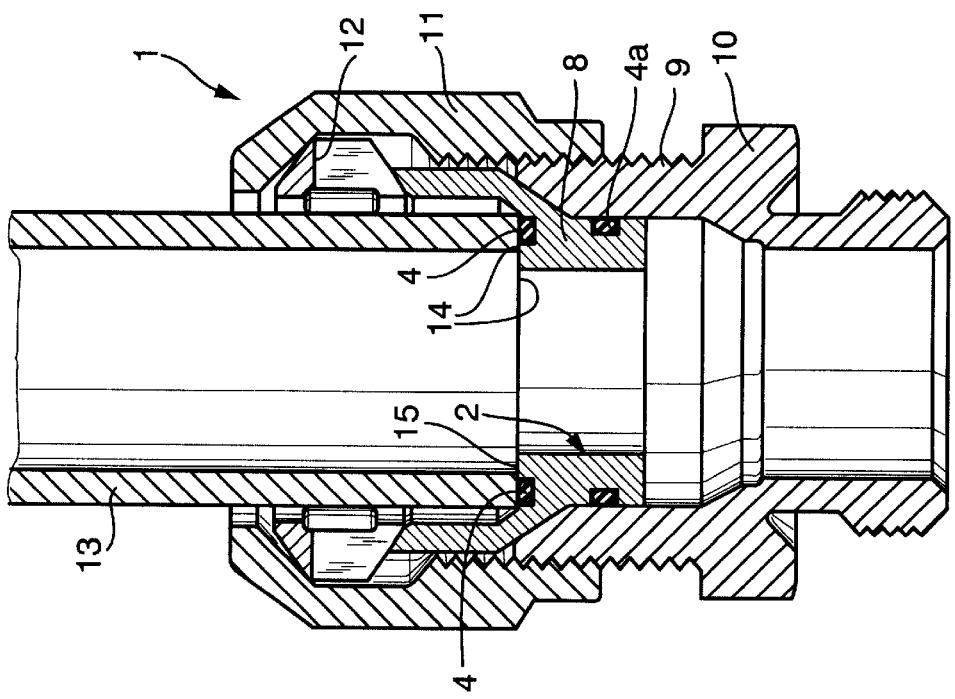
FIG. 2 is a longitudinal section of a pipe screw connection with a stop insert for the pipe without a support sheath that engages the pipe interior, wherein the stop insert has a sealing ring running around the outside, and in its stop area has a seal that acts together the end face of the inserted pipe.

FIGS. 2 and 3 show respective embodiments of a connection fitting, indicated as a whole by 1, in the form of a pipe screw connection approximately according to German utility model DE 93 15 601 U1, with a stop insert, indicated as a whole by 8, as a fitting body 2, which is held in a receiving sheath 10 provided with an outer thread 9 and fastened by a swivel nut 11 and a clamping insert 12. A pipe 13 to be attached extends with its end face 14 up to a stop surface 15 of the stop insert 8 and can be tightened and held tight in a known way using the clamping insert 12.

In the embodiment according to FIG. 2 the stop insert 8 does not have a support sheath that engages the pipe, but instead has a seal 4 worked into its stop surface 15 and acts together with the end face 14 of the pipe and is made of a plastic that is incompatible with the plastic of the stop insert 8.

Furthermore, a seal 4a is provided on the outside of the stop insert 8, which acts together with the receiving sheath 10 and also can be made of a plastic which is incompatible with that of the stop sheath 8.

Upon inserting the pipe 13 and with the relative rotations that occur screwing it in, in particular in the last part of the attachment when the clamping insert 12 has already grasped the pipe 13 and the stop insert 8 is also fixed by conical surfaces, relative rotations can occur between the pipe 13 and the seal 4, such that the seal 4 can then turn along with the pipe 13 relative to the stop insert 8, since the two different plastic components of this stop insert 8, made of several plastic components, are plastics that are incompatible with each other and allow a relative rotation.

FIG. 3 shows an embodiment similar to that of FIG. 2, where likewise a connection fitting 1 in the form of a pipe screw connection is provided with parts matching those according to FIG. 2. The stop insert 8, however, has in this case a support sheath 16, which engages the inside of the pipe 13 starting from the stop surface 15 and allows a better clamping. Here, the seal 4 consisting of incompatible plastic relative to that of the stop insert 8 is provided in this case on the outside of this support sheath 16. Both the seal 4 and the seal 4a in this case, depending on the relative rotation and stress through the opposing surfaces, can also be rotated relative to the stop insert 8, since they are indeed a multi-component plastic part together with this insert, but consist of a plastic that is incompatible with that of the actual stop insert.

It will be appreciated by those skilled in the art that changes could be made to the embodiment(s) described above without departing from the broad inventive concept thereof. It is understood, therefore, that this invention is not limited to the particular embodiment(s) disclosed, but it is intended to cover modifications within the spirit and scope of the present invention as defined by the appended claims.

We claim:

1. A method for combining a connection fitting (1) with an opposing surface, comprising the step of rotationally attaching the fitting (1) to the opposing surface, wherein the rotational attachment step comprises screwing the fitting (1) into the opposing surface by threads (3) on an outer surface of a fitting body (2), wherein said connection fitting (1) is formed by at least one seal (4, 4a), wherein the seal (4, 4a) is ring-shaped and lies in a ring groove (6) extending around a peripheral area of the fitting body (2), the seal (4, 4a) being flexible in an area of the ring groove (6) in an axial direction, wherein a radial depth of the ring groove (6) is approximately equal to or smaller than a radial overhang of the seal (4) in its non-deformed state relative to an outer diameter of the threads (3), the seal being manufactured together with a fitting body (2, 8) in an injection molding process thereby forming a multi-component plastic part in which the fitting body (2, 8) is made of a hard plastic component and the seal (4, 4a) is made of a soft plastic component, said hard and soft plastic components being of the kind that do not adhere to one another, and in which the seal (4, 4a) is secured in an axial direction on the fitting body (2) in a form-fit manner, wherein during the rotational attachment step the seal is rotatable relative to the fitting body (2).

2. The method according to claim 1, wherein the fitting body (2, 8) is made of POM and the seal is made of a material selected from the group consisting of thermoplastic elastomer, EPDM rubber, and silicone.

3. The method according to claim 1, wherein the seal (4, 4a) has a form of sealing ring which is rotatable in the groove (6) recessed in the fitting body (2).

4. The method according to claim 1, wherein the fitting body (2) is selected from the group consisting of drain plugs for radiators or other liquid containers, ventilation valves, pipe connectors, lids, stop inserts, support sheaths, and clamping rings for a pipe thread.

5. The method according to claim 1, wherein at least one separate part (10, 11, 12) is connected to the fitting body (2) for the rotational attachment.

6. A method for combining a connection fitting (1) with an opposing surface, comprising the step of rotationally attaching the fitting (1) to the opposing surface, wherein said connection fitting (1) is formed by at least one seal (4, 4a) manufactured together with a fitting body (2, 8) in an injection molding process thereby forming a multi-component plastic part in which the fitting body (2, 8) is made of a hard plastic component and the seal (4, 4a) is made of a soft plastic component, said hard and soft plastic components being of the kind that do not adhere to one another, and in which the seal (4, 4a) is secured in an axial direction on the fitting body (2) in a form-fit manner, wherein during the rotational attachment step the seal is rotatable relative to the fitting body (2) in a peripheral direction, wherein the rotational attachment step comprises screwing the fitting (1) into the opposing surface by threads (3) on an outer surface of the fitting body (2) and a stop (5) is arranged behind the threads (3) in a screw-in-direction, and wherein the seal (4, 4a) is arranged in a progression of the threads (3) or between the threads (3) and the stop (5).

7. A method for combining a connection fitting (1) with an opposing surface, comprising the step of rotationally attaching the fitting (1) to the opposing surface, wherein said connection fitting (1) is formed by at least one seal (4, 4a) manufactured together with a fitting body (2, 8) in an injection molding process thereby forming a multi-component plastic part in which the fitting body (2, 8) is made of a hard plastic component and the seal (4, 4a) is made of a soft plastic component, said hard and soft plastic components being of the kind that do not adhere to one another, and in which the seal (4, 4a) is secured in an axial direction on the fitting body (2) in a form-fit manner, wherein during the rotational attachment step the seal is rotatable relative to the fitting body (2) in a peripheral direction, wherein the fitting body (2) comprises a stop insert (8), and further comprising inserting the stop insert (8) into a screw connection.

8. The method according to claim 7, wherein the seal (4, 4a) is arranged at a ring groove on at least one position selected from the group consisting of an inside stop surface (15) and an outer side of the stop insert (8).

9. The method according to claim 7, wherein the screw connection comprises a support sheath (16).

10. The method according to claim 9, wherein the seal (4, 4a) is arranged at a ring groove on at least one position selected from the group consisting of an inside stop surface (15), an outer side of the stop insert (8), and an outer side of the support sheath (16).

* * * * *